(12) United States Patent
Ho

(10) Patent No.: US 8,873,471 B2
(45) Date of Patent: Oct. 28, 2014

(54) METHOD AND APPARATUS FOR IMPLEMENTING LTE RLC HEADER FORMATS

(75) Inventor: Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 879 days.

(21) Appl. No.: 12/241,416

(22) Filed: Sep. 30, 2008

(65) Prior Publication Data

US 2009/0086710 A1 Apr. 2, 2009

Related U.S. Application Data

(60) Provisional application No. 60/976,768, filed on Oct. 1, 2007.

(51) Int. Cl.
*H04W 4/00* (2009.01)
*H04W 28/06* (2009.01)
*H04W 80/02* (2009.01)

(52) U.S. Cl.
CPC .............. *H04W 28/06* (2013.01); *H04W 80/02* (2013.01)
USPC ............ 370/329; 370/330; 370/331; 370/338

(58) Field of Classification Search
None
See application file for complete search history.

(56) References Cited

U.S. PATENT DOCUMENTS

| 7,457,927 | B2 * | 11/2008 | Sivaram | 711/162 |
| 2002/0048281 | A1 * | 4/2002 | Yi et al. | 370/474 |
| 2005/0074024 | A1 | 4/2005 | Kim et al. | |
| 2008/0144556 | A1 * | 6/2008 | Rinne | 370/310 |
| 2009/0190480 | A1 * | 7/2009 | Sammour et al. | 370/242 |
| 2010/0178923 | A1 * | 7/2010 | Yi et al. | 455/436 |

FOREIGN PATENT DOCUMENTS

| CA | 2640885 A1 | 7/2007 |
| CN | 1870810 A | 11/2006 |
| JP | 2006229620 A | 8/2006 |
| JP | 2007074170 A | 3/2007 |

(Continued)

OTHER PUBLICATIONS

"3rd Generation Partnership Project; Technical Specification Group Radio Access Network; Evolved Universal Terrestrial Radio Access (E-UTRA)Radio Link Control (RLC) protocol specification(Release 8)" 3GPP Draft; TS 36.322 V0.2.3 (With Revision Marks), 3rd Generation Partnership Project (3GPP), Mobile Competence Centre; 650, Route Des Lucioles; F-06921 Sophia-Antipolis Cedex; France, vol. RAN WG2, No. Athens, Greece; 20070820, Sep. 6, 2007, pp. 1-19.*

(Continued)

*Primary Examiner* — Huy D Vu
*Assistant Examiner* — Zewdu A Beyen
(74) *Attorney, Agent, or Firm* — Dalei Dong

(57) ABSTRACT

Systems and methodologies of reducing overhead by designating various fields in an optimized Radio Link Control header. Depending on communication type (e.g., VoIP, non-VoIP) such fields include a combination of a Segment Indicator (SI—which indicates presence of a whole SDU at beginning or at an ending), a Sequence Number (SN), a Length Indicator (LI—which indicates length of a service data unit); a length for the length indicator (LLI—to enable a variable size for the LI and notify a receiver regarding such varying size); a Segment Offset (SO—to designate resegmented packets for lost protocol data units); a length indicator for the SO (LSO—to enable a variable size for the SO); and Last Segment Flag (LSF—for resegmentation of RLC protocol data units).

26 Claims, 10 Drawing Sheets

(56) References Cited

FOREIGN PATENT DOCUMENTS

| RU | 2298878 C2 | 5/2007 |
| WO | WO2004042987 A1 | 5/2004 |
| WO | WO2007091840 A1 | 8/2007 |
| WO | 2008084992 A1 | 7/2008 |

OTHER PUBLICATIONS

Ericsson: "RLC header structure" 3GPP Draft; R2-073228 RLC Header, 3rd Generation Partnership Project (3GPP), Mobile Competence Centre ; 650, Route Des Lucioles; F-06921 Sophia-Antipolis Cedex; France, vol. RAN WG2, No. Athens, Greece; 20070820, Aug. 20, 2007, pp. 1-9, XP050135955.*

"3rd Generation Partnership Project;Technical Specification Group Radio Access Network;Evolved Universal Terrestrial Radio Access (E-UTRA)Radio Link Control (RLC) protocol specification(Release 8)" 3GPP Draft; TS 36.322 V023 (With Revision Marks), 3rd Generation Partnership Project (3GPP), Mobile Competence Centre ; 650, Route Des Lucioles ; F-06921 Sophia-Antipolis Cedex ; France, vol. RAN WG2, No. Athens, Greece; 20070820, Sep. 6, 2007, pp. 1-19, XP050136525 paragraph [4.2.1] paragraph [4.2.1.3] paragraph [6.2.1.5] paragraph [6.2.2.3] paragraph [6.2.2.5] - paragraph [6.2.2.8].

Ericsson: "RLC header structure" 3GPP Draft; R2-073228 RLC Header, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Aug. 20, 2007, pp. 1-9, XP050135955 p. 8, line 1-line 4 paragraph [0002]-paragraph [0003] figures 1-3.

International Search Report and the Written Opinion—PCT/US-2008/078449, International Search Authority—European Patent Office—Jun. 5, 2009.

Qualcomm Europe: "RLC considerations" 3GPP Draft; R2-062958 RLC Considerations, 3rd Generation Partnership Project (3GPP), Mobile Competence Centre ; 650, Route Des Lucioles ; F-06921 Sophia-Antipolis Cedex ; France, vol. RAN WG2, No. Seoul, Korea; Oct. 9, 2006, pp. 1-4, XP050132470 Seoul, Korea paragraph [0002] table 1.

Texas Instruments Inc: "On the Open Issues related to RLC Header Format" GPP Draft; R2-073471_RLCHEADER_0penissues T I, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Aug. 20, 2007, pp. 1-7, XP050136174 paragraph [0002]-paragraph [0004] figures 1,2.

3GPP TSG RAN; Evolved Universal Terrestrial Radio Access(E-UTRA) Radio Link Control(RLC) protocol specification (Release 8) , 3GPP Draft; TS 36.322 v1.0.0.(Sep. 2007).

3GPP TSG RAN WG2#59 R2-073551, Fujitsu, "RLC header structure", Agenda Item 5.2.2, Athens, Greece(Aug. 20-24, 2007).

Taiwan Search Report—TW097137813—TIPO—Nov. 1, 2012.

\* cited by examiner

METHOD AND APPARATUS FOR IMPLEMENTING LTE RLC HEADER FORMATS

CLAIM OF PRIORITY UNDER 35 U.S.C. §119

The present Application for Patent claims priority to Provisional Application No. 60/976,768 entitled "LTE RLC HEADER FORMATS" filed on Oct. 1, 2007, and assigned to the assignee hereof and hereby expressly incorporated by reference herein.

BACKGROUND

1. Field

The following description relates generally to wireless communications, and more particularly to methods and apparatus for optimizing Radio Link Control (RLC) headers.

2. Background

Wireless communication systems are widely deployed to provide various types of communication, for example, voice, data, and so on can be provided by such wireless communication systems. A typical wireless communication system, or network, can provide multiple users access to one or more shared resources (e.g., bandwidth, transmit power, . . . ). For example, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, a wireless multiple-access communication system can simultaneously support communication for multiple access terminals. Each access terminal can communicate with one or more base stations through transmissions on the forward and reverse links. The forward link (or downlink) refers to the communication link from the base stations to the access terminals, and the reverse link (or uplink) refers to the communication link from the access terminals to the base stations. This communication link may be established through a single-in-single-out, multiple-in- single-out, or a multiple-in-multiple-out (MIMO) system.

Wireless communication systems sometimes employ one or more base stations, each base station providing a coverage area. A typical base station can transmit multiple data streams for broadcast, multicast, and/or unicast services, wherein a data stream may be a stream of data that can be of independent reception interest to an access terminal. An access terminal within the coverage area of such base station can be employed to receive one, more than one, or all the data streams carried by a composite stream. Likewise, an access terminal can transmit data to the base station or another access terminal.

Several advancements are currently considered for Long Term Evolution (LTE) advanced system like Multi User MIMO, higher order MIMO (with 8 transmit and receive antennas), Network MIMO, Femto cells with Restricted Association, Pico cells with range extension, larger bandwidths, and the like. LTE advanced has to support legacy UEs (LTE release 8 UEs) while providing additional features to new UEs (and legacy UEs when possible). However, supporting all features in LTE can put several constraints on LTE advanced design and limit the possible gains and heavily impact user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with reducing overhead for communication frames in both uplink/down link by optimizing a Radio Link Control header. Based on type of communication (e.g., VoIP, non-VoIP), such optimization is performed by designating various fields in the Radio Link Control (RLC) header, to include a combination of: a Segment Indicator (SI—which indicates presence of a whole SDU at beginning or at an ending), a Sequence Number (SN), a Length Indicator (LI—which indicates length of a service data unit); a length for the length indicator (LLI—to enable a variable size for the LI and notify a receiver regarding such varying size); a Segment Offset (SO—to designate resegmented packets for lost protocol data units); a length indicator for the SO (LSO—to enable a variable size for the SO); and Last Segment Flag (LSF—for resegmentation of RLC protocol data units). In particular, for the VoIP communication frames (which are relatively small) a single byte RLC header can be employed, wherein such optimized RLC header can include a one bit Resegmentation field (R) (which indicates type of packet—e.g., set to zero for indication of VoIP packets), a two bit Segment Indicator (SI) field; a four bit sequence number (SN) field; a one bit extension (E) and a seven bit LI field.

In another aspect, for non-VoIP packets, the RLC header includes a first bit that designates type of header and relates to any data type other than VoIP to include formats such as IP, video, streaming, and the like. Moreover, the SI indicates presence of a whole SDU at beginning or at an ending; the RI indicates reserved bits and the LI is a length indicator. For example, if a whole Service Data Unit (SDU) is inside one protocol data unit (PDU), then the LI can indicate the length of the first SDU. As explained earlier, the segment indicator can designate whether a whole SDU exists at the beginning and/or a whole SDU at the ending, which further facilitates a reconstruction of the SDUs in the PDU with the LDU (e.g., LI is the number of SDUs minus one).

According to a further aspect, the segment offset (SO) designates re-segmented packets for the data transmission, to facilitate resending a lost PDU transmission. Such segment offset (SO) field is included in the header and indicates different lengths of bits. Likewise, the Last Segment Flag (LSF) indicates to the receiver that the last segment of the PDU has arrived (e.g., by setting the indicator to "1"; while for other re-segmented PDU it can be set to "0"), and accommodate for non-sequential order of segments received. Accordingly, when radio conditions deteriorate and the transmitter has less bandwidth to send the PDU (e.g., transmitter cannot fit the whole original PDU inside the physical layer frame), the LSF notifies the receiver regarding arrival of the last piece of the PDU.

According to a related methodology, the transmitter can determine length of the SO field and then designate the LSO field accordingly. Likewise, on the receiver side a determination is made as to type of header received, and the receiver further examines the SI to verify segmentations (e.g., whether the first bit is beginning of the SDU and whether the last bit is the end of the SDU.)

Another aspect relates to a wireless communications apparatus that enables a transmitter to generate such RLC headers, and a receiver to receive and recognize such header formats. Still another aspect relates to a computer program product that can comprise a computer-readable medium. The computer-readable medium can include code that enables both a base station and access terminal to generate and recognize such headers. A further related aspect in a wireless communication system is an apparatus comprising a processor. The processor is configured to generate optimized RLC headers of the subject innovation.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
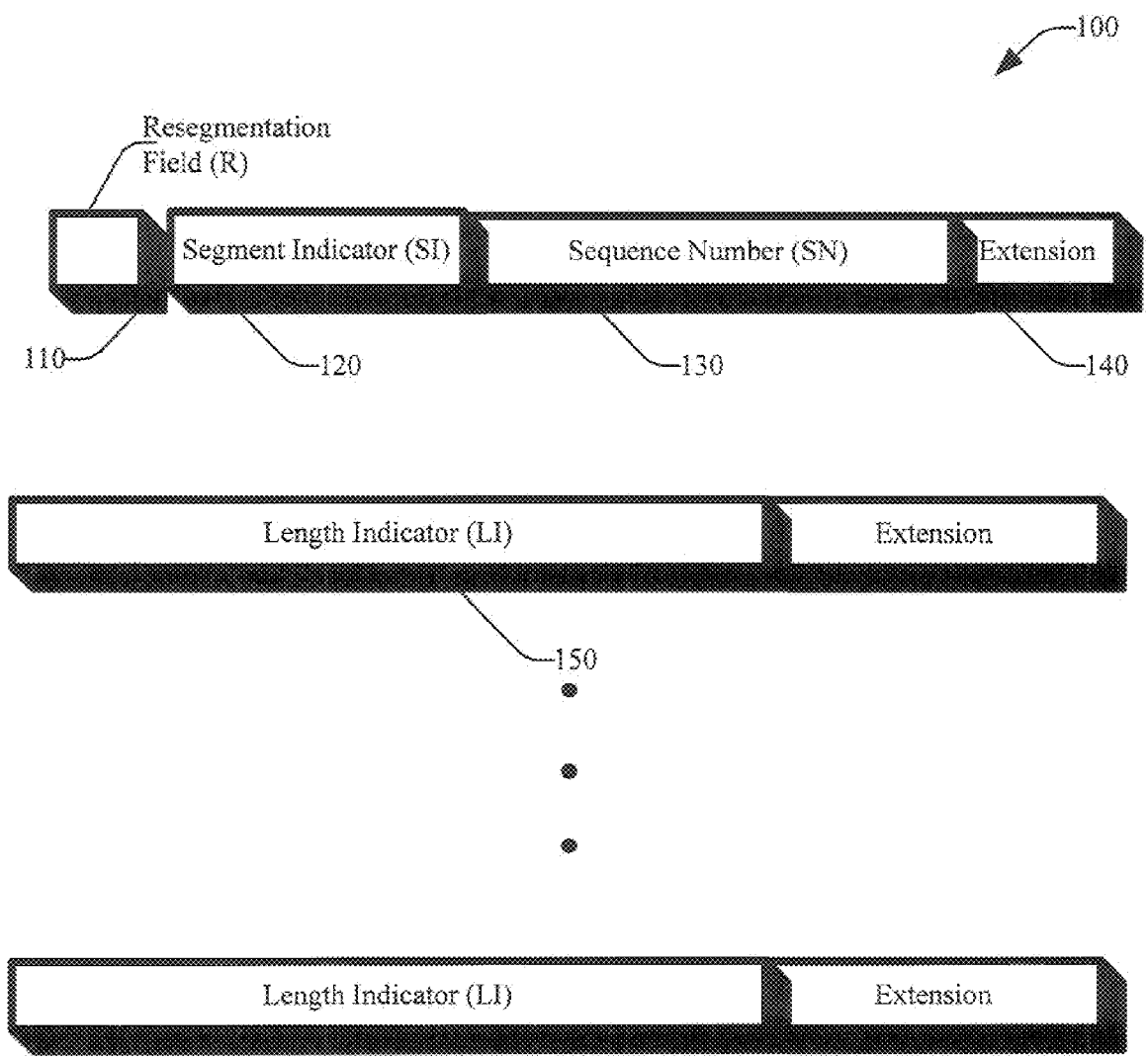
FIG. 1 illustrates a block diagram for a particular Radio Communication Link (RLC) header arrangement for Voice over Internet Protocol (VoIP), according to an aspect of the subject innovation.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software,in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates a particular RLC header format 100 for low-bit rate flows such as VoIP communication, which typically designates a protocol optimized for the transmission of voice through the Internet or other packet-switched networks. The RLC header 100 includes a 1-bit resegmentation filed (R) 110, a 2-bit SI field 120, a 4-bit SN field 130, a 1-bit Extension field (E) 140 and a 7-bit LI field 150. Typically, the resegmentation field 110 indicates the type of header (e.g., for a VoIP, non-VoIP), and is set to "0" to notify a receiver regarding VoIP packets, and distinguish such packet from non-VoIP packets. Likewise, the Segment Indicator (SI) field 120 can indicate presence of a whole SDU at beginning or at an ending for the transmission. Moreover, the LI field 150 can indicate a length of a service data unit.

Furthermore, other aspects of the header for the subject innovation enables identification for the RLC PDUs that are truly missing so that it can send an RLC Nak to request for retransmission, Typically, in Long Term Evolution (LTE), Radio Link Control (RLC) Protocol Data Units (PDUs) can be delivered out-of-sequence due to Hybrid Automatic Repeat-reQuest (HARQ). In LTE, the RLC layer employs the HARQ layer to transmit the RLC PDUs. Since the HARQ layer uses multiple. HARQ channels for transmission in parallel, the RLC PDUs may be delivered out-of-order at the receiving side. Even though there can exist a re-ordering buffer at the RLC receiver to re-order the RLC PDUs received from different HARQ channels, when there is a "gap" in the received RLC PDU sequence numbers, the receiver cannot readily conclude that those PDUs corresponding to the "gap" are missing since they may still be in the process of delivery at the HARQ layer.

Figure 2:
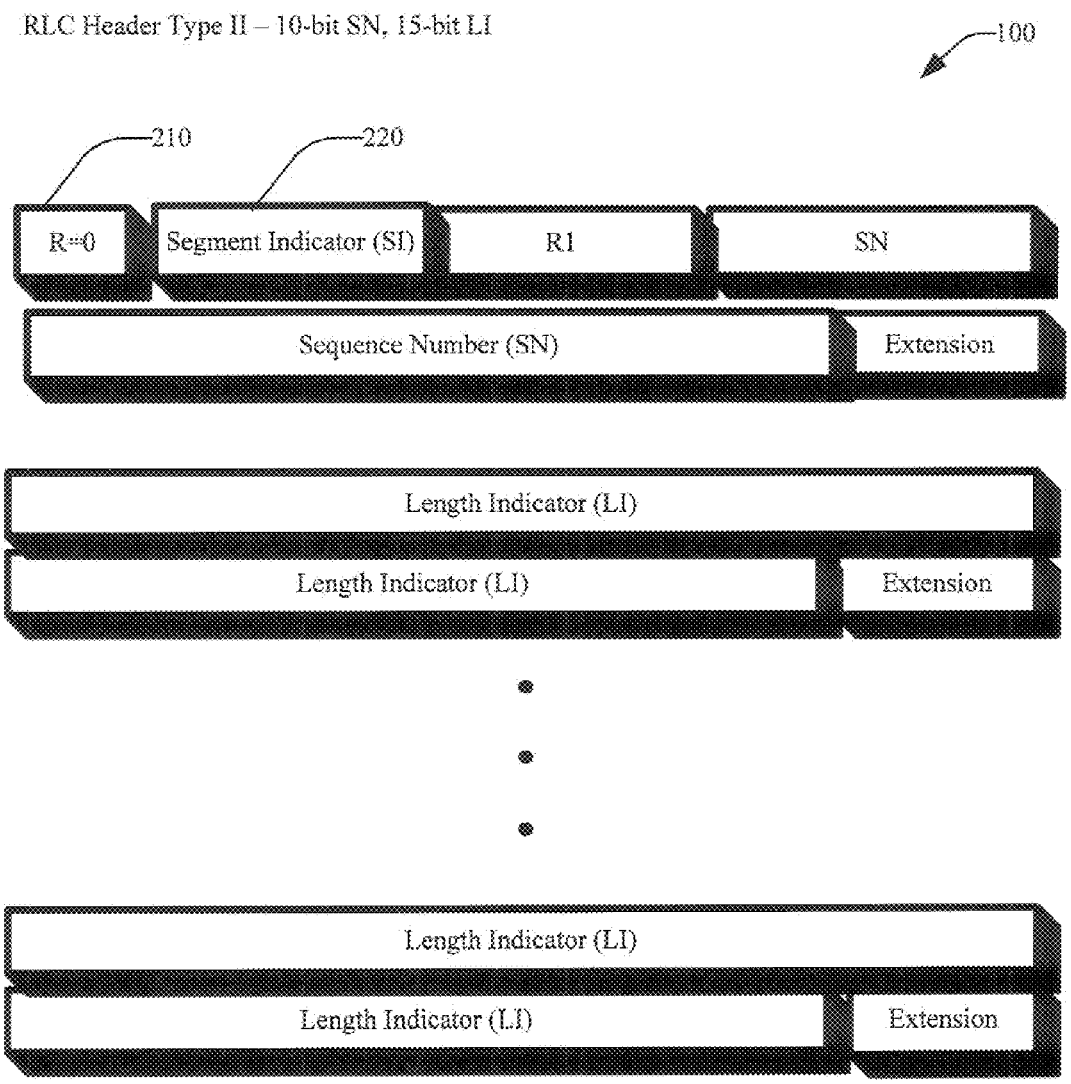
FIG. 2 illustrates a block diagram for another optimized RLC header arrangement according to further aspect of the subject innovation.
Figure 3:
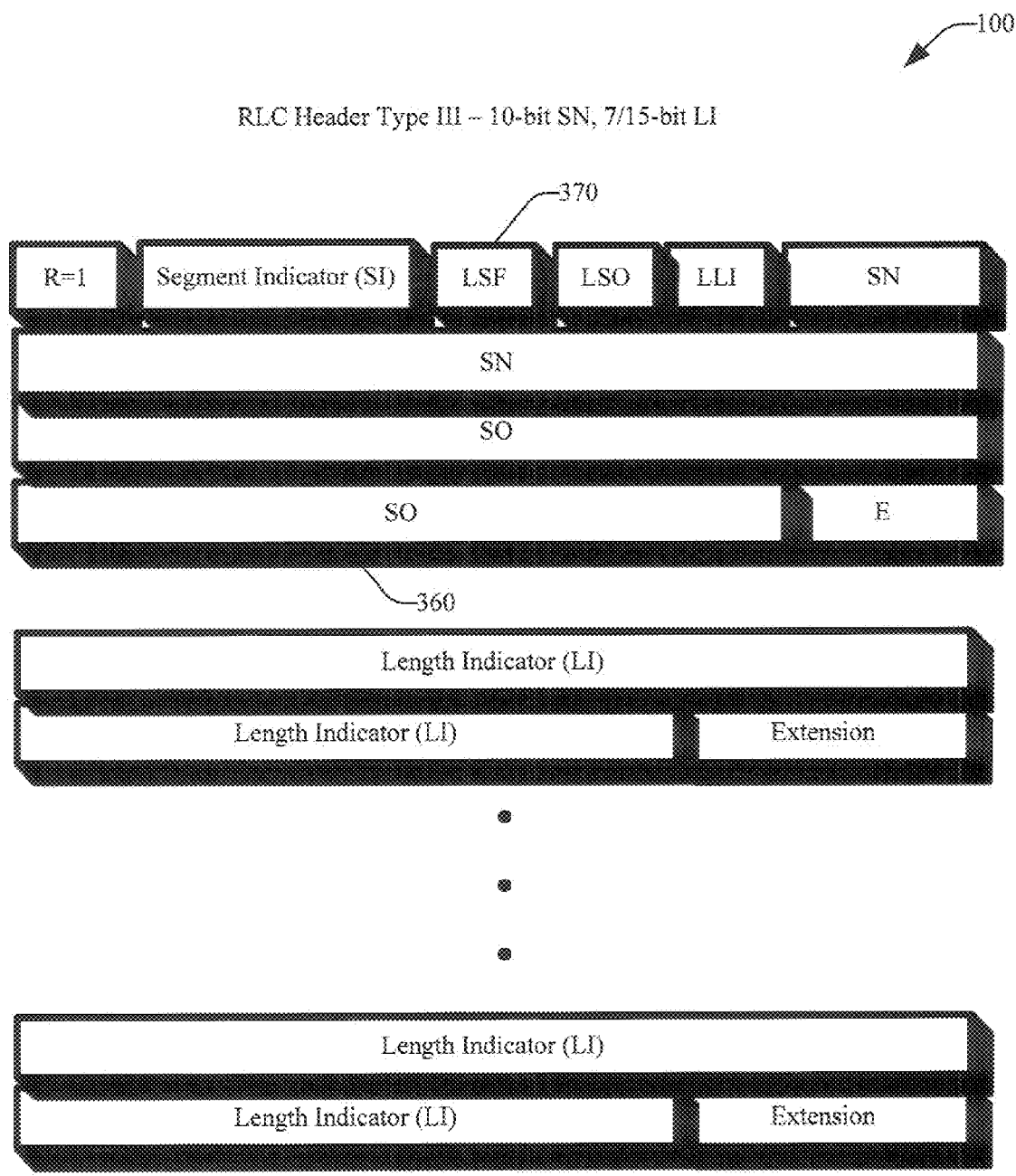
FIG. 3 illustrates a further header arrangement for resegmented RLC Protocol Data Units (PDUs) for transmission flows.

Consequently, some RLC PDUs that have not been received may appear missing when they are in fact still being delivered by the HARQ. Thus, the receiving RLC may not send an RLC Nak (negative acknowledgment) to correct the problem immediately. FIG. 2 and FIG. 3 illustrate exemplary header arrangements that can mitigate such issues.

For example, FIG. 2 illustrates an exemplary header arrangement 200 for non-VoIP packets. As illustrated, the RLC header includes a first bit 210 that designates type of header and relates to any data type other than VoIP to include formats such as IP, video, streaming, and the like. Moreover and as explained earlier, the SI 220 indicates presence of a whole SDU at beginning or at an ending; the RI indicates reserved bits and the LI is a length indicator. For example, if a whole Service Data Unit (SDU) is inside one protocol data unit (PDU), then the LI can indicate the length of the first SDU. As explained earlier, the segment indicator 220 can designate whether a whole SDU exists at the beginning and/or a whole SDU at the ending, which further facilitates a reconstruction of the SDUs in the PDU with the LDU (e.g., LI is the number of SDUs minus one).

FIG. 3 illustrates an additional header arrangement according to a particular aspect, which includes the segment offset (SO) 360. Such segment offset designates re-segmented packets for the data transmission, to facilitate resending a lost PDU transmission, and further indicates different lengths of bits. Likewise, the Last Segment Flag (LSF) 370 indicates to the receiver that the last segment of the PDU has arrived (e.g., by setting the indicator to "1"; while for other re-segmented PDU it can be set to "0"), and accommodate for non-sequential order of segments received. Accordingly, when radio conditions deteriorate and the transmitter has less bandwidth to send the PDU (e.g., transmitter cannot fit the whole original PDU inside the physical layer frame), the LSF notifies the receiver regarding arrival of the last piece of the PDU.

Figure 4:
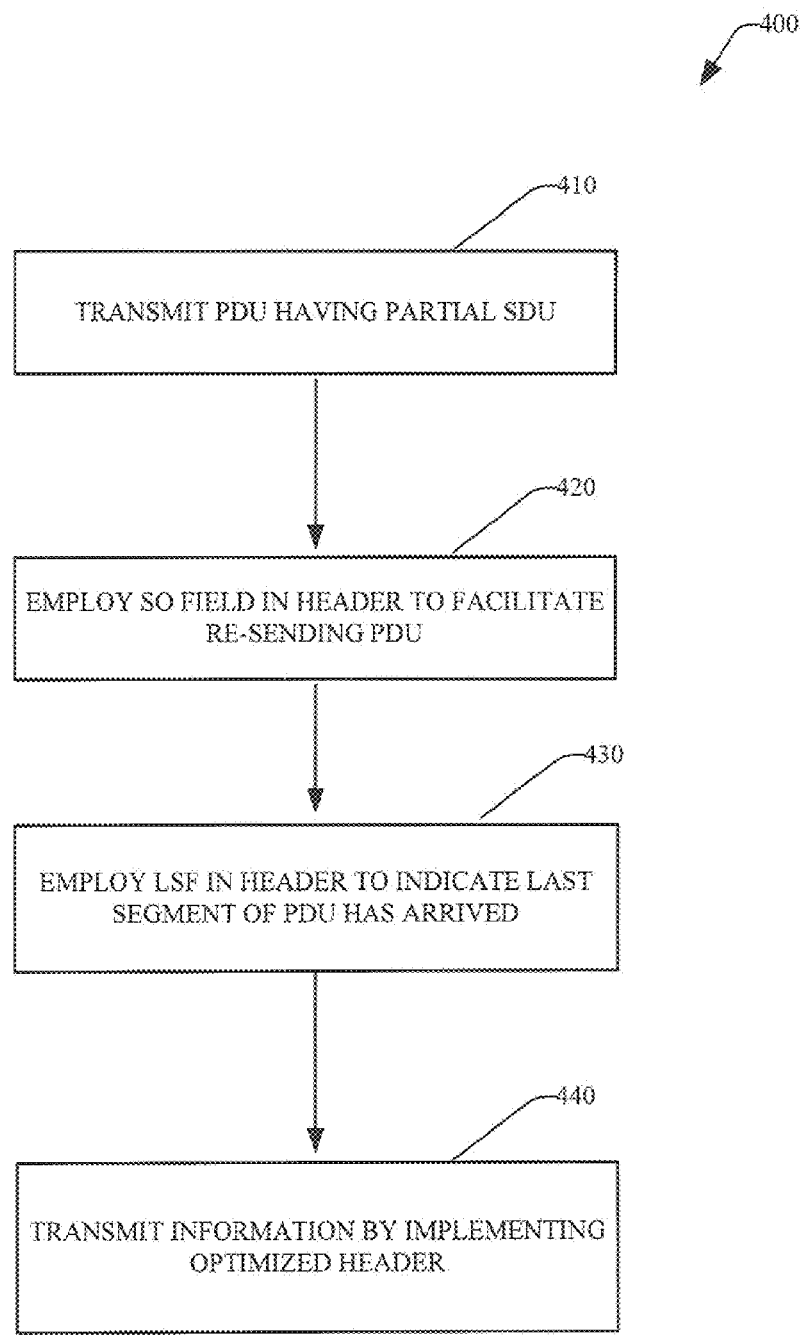
FIG. 4 illustrates a methodology of implementing an optimized RLC header according to a further aspect of the subject innovation.

FIG. 4 illustrates a related methodology 400 of reducing overhead for communication frames in both uplink/down link by optimizing a Radio Link Control header, according to an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410, a PDU can have been transmitted comprising a partial SDU, where the other portion of the SDU has been transmitted and successfully received. For instance, the PDU can have been received in error, and a NAK can have been received. In an ARQ scheme, NAK data units can be retransmitted. Next and at 420, resegmented packets for data transmission can be indicated in the segment offset (SO), which facilitates resending a lost PDU transmission, and further indicates different lengths of bits. Subsequently, and at 430 a LSF can be inserted in to the header that indicates to the receiver that the last segment of the PDU has arrived. As explained earlier, when the transmitter has reduced bandwidth and cannot fit the whole original PDU inside the physical layer frame), the LSF notifies the receiver regarding arrival of the last piece of the PDU. At 440, transmittal can occur by employing the optimized header arrangement of the subject innovation.

Figure 5:
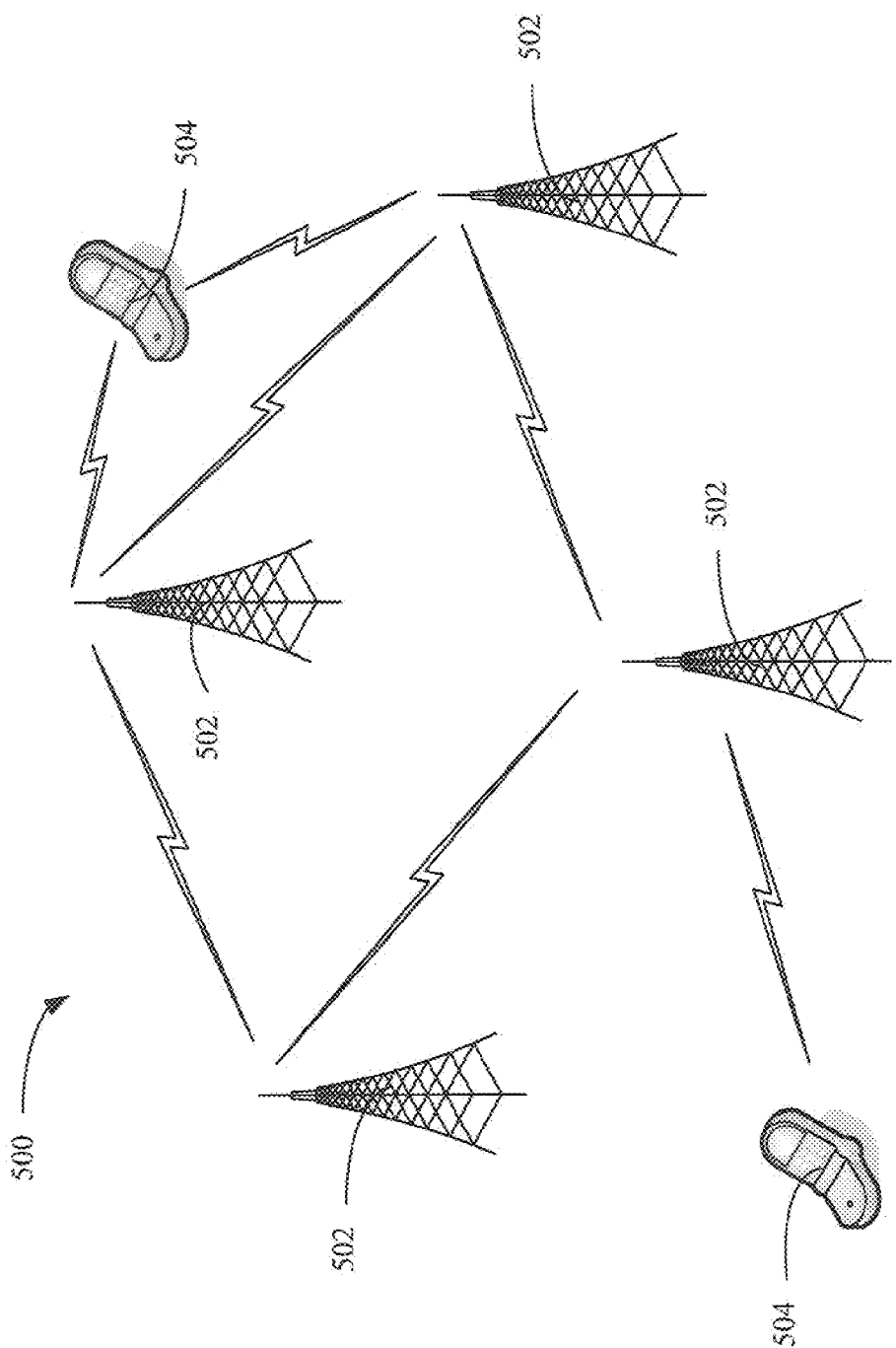
FIG. 5 illustrates a wireless communication according to an aspect of the subject innovation.

Referring now to FIG. 5, a wireless communication system 500 in accordance with various aspects presented herein is illustrated. System 500 can comprise one or more base stations 502 in one or more sectors that receive, transmit, repeat, and so forth, wireless communication signals to each other and/or to one or more mobile devices 504. Each base station 502 can comprise multiple transmitter chains and receiver chains (e.g., one for each transmit and receive antenna), each of which can in turn comprise a plurality of components associated with signal transmission and reception (e.g. processors, modulators, multiplexers, demodulators, demultiplexers, antennas, and so forth). Each mobile device 504 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, an so on), as will be appreciated by one skilled in the art.

When a base station 502 transmits a signal of a certain signal format on top of another signal format, such as OFDM, the time order of samples of this signal, as received at mobile device 504, could be distorted and/or corrupted. Therefore, mobile device 504 can be configured to recognize/generate optimized RLC headers as described in detail supra.

As described in detail above, based on type of communication (e.g., VoIP, non-VoIP), optimization can be performed on RLC headers by designating various fields in the Radio Link Control (RLC) header, to include a combination of: a Segment Indicator (SI—which indicates presence of a whole SDU at beginning or at an ending), a Sequence Number (SN), a Length Indicator (LI—which indicates length of a service data unit); a length for the length indicator (LLI—to enable a variable size for the LI and notify a receiver regarding such varying size); a Segment Offset (SO—to designate resegmented packets for lost protocol data units); a length indicator for the SO (LSO—to enable a variable size for the SO); and Last Segment Flag (LSF—for resegmentation of RLC protocol data units).

Figure 6:
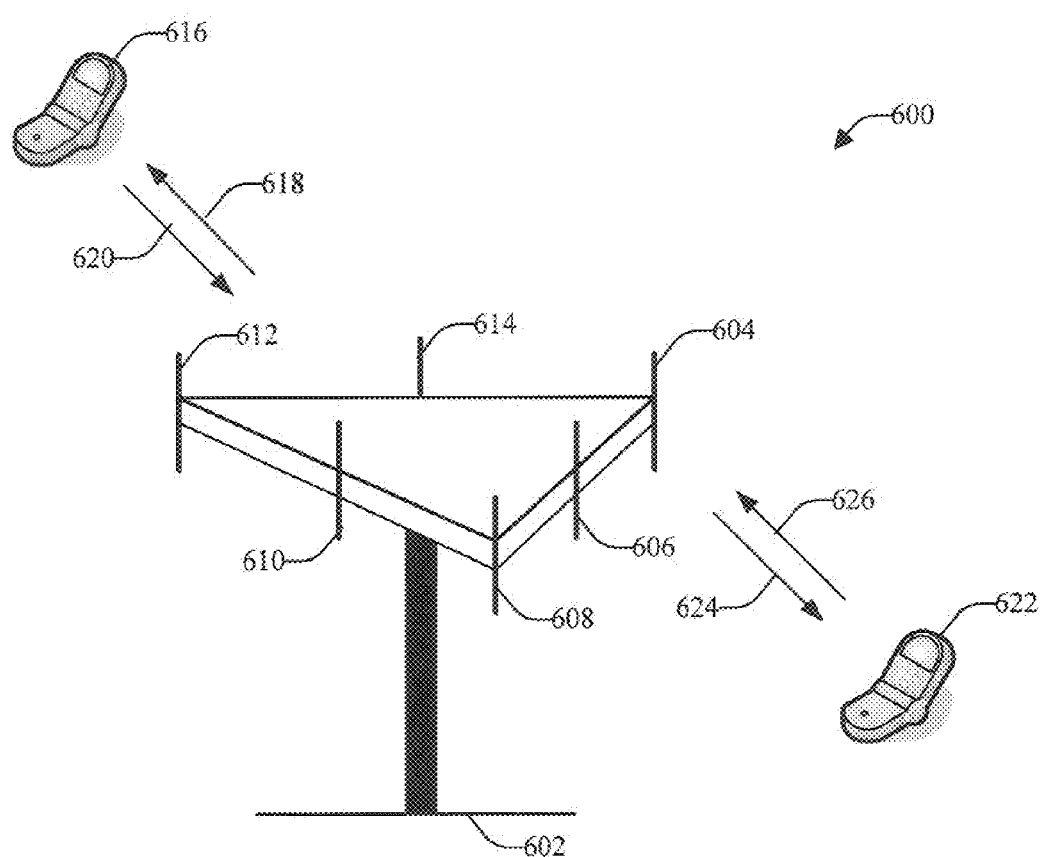
FIG. 6 illustrates a multiple access wireless communication system according to one or more aspects.

Referring now to FIG. 6, a multiple access wireless communication system 600 according to one or more aspects is illustrated. A wireless communication system 600 can include one or more base stations in contact with one or more user devices. Each base station provides coverage for a plurality of sectors. A three-sector base station 602 is illustrated that includes multiple antenna groups, one including antennas 604 and 606, another including antennas 608 and 610, and a third including antennas 612 and 614. According to the figure, only two antennas are shown for each antenna group, however, more or fewer antennas may be utilized for each antenna group. Mobile device 616 is in communication with antennas 612 and 614, where antennas 612 and 614 transmit information to mobile device 616 over forward link 618 and receive information from mobile device 616 over reverse link 620. Forward link (or downlink) refers to the communication link from the base stations to mobile devices, and the reverse link (or uplink) refers to the communication link from mobile devices to the base stations. Mobile device 622 is in communication with antennas 604 and 606, where antennas 604 and 606 transmit information to mobile device 622 over forward link 624 and receive information from mobile device 622 over reverse link 626. In a FDD system, for example, communication links might utilize different frequencies for communication. For example, forward link 618 might use a different frequency than the frequency utilized by reverse link 620.

Each group of antennas and/or the area in which they are designated to communicate may be referred to as a sector of base station 602. In one or more aspects, antenna groups each are designed to communicate to mobile devices in a sector or the areas covered by base station 602. A base station may be a fixed station used for communicating with the terminals.

In communication over forward links 618 and 624, the transmitting antennas of base station 602 can utilize beamforming in order to improve a signal-to-noise ratio of forward links for the different mobile devices 616 and 622. Also, a base station utilizing beamforming to transmit to mobile devices scattered randomly through its coverage area might cause less interference to mobile devices in neighboring cells than the interference that can be caused by a base station.

Figure 7:
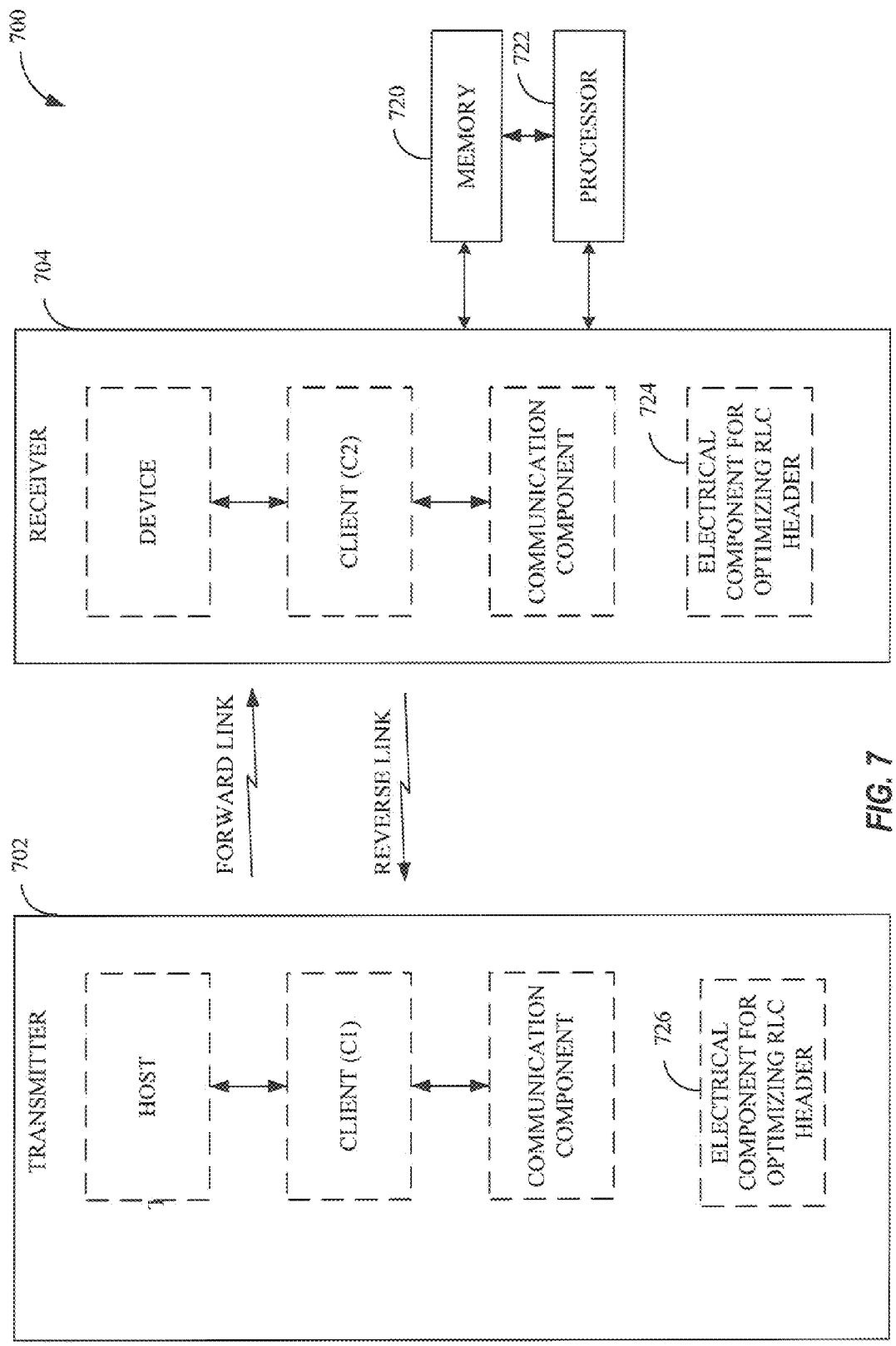
FIG. 7 illustrates a communication system that implements optimized RLC headers.

FIG. 7 illustrates a communication system 700 that can include memory 720 operatively coupled to receiver 704. Memory 720 can be external to receiver 704 or can reside within receiver 704. Memory 720 can store information related to receiving a composite signal that includes a bearing signal and a carry-on signal, performing FFT and/or IFFT processing, analyzing a cyclic prefix delay, selectively utilizing data sample rearrangement based on analysis of the cyclic prefix delay, and other suitable information related to signals transmitted and received in a communication network. A processor 722 can be operatively connected to receiver 704 (and/or memory 720) to facilitate analysis of information related to data sample rearrangement in a communication network. Processor 722 can be a processor dedicated to analyzing and/or generating information received by receiver 704, a processor that controls one or more components of system 700, and/or a processor that both analyzes and generates information received by receiver 704 and controls one or more components of system 700. Moreover, both the receiver 704 and the transmitter 702 can include electrical components 724, 726 that enable generation and recognition of header formats according to various aspects of the subject innovation. For example, such electrical components can further include: designating means for designating resegmented data packets for lost protocol data units in a RLC header; means for accommodating a variable size for the designating means; and means for identifying a last segment for last segment of a PDU in the RLC header.

Memory 720 can store protocols associated with data sample rearrangement, taking action to control communication between receiver 704 and transmitter 702, etc, such that system 700 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 720 of the disclosed aspects are intended to comprise, without being limited to, these and other suitable types of memory.

Figure 8:
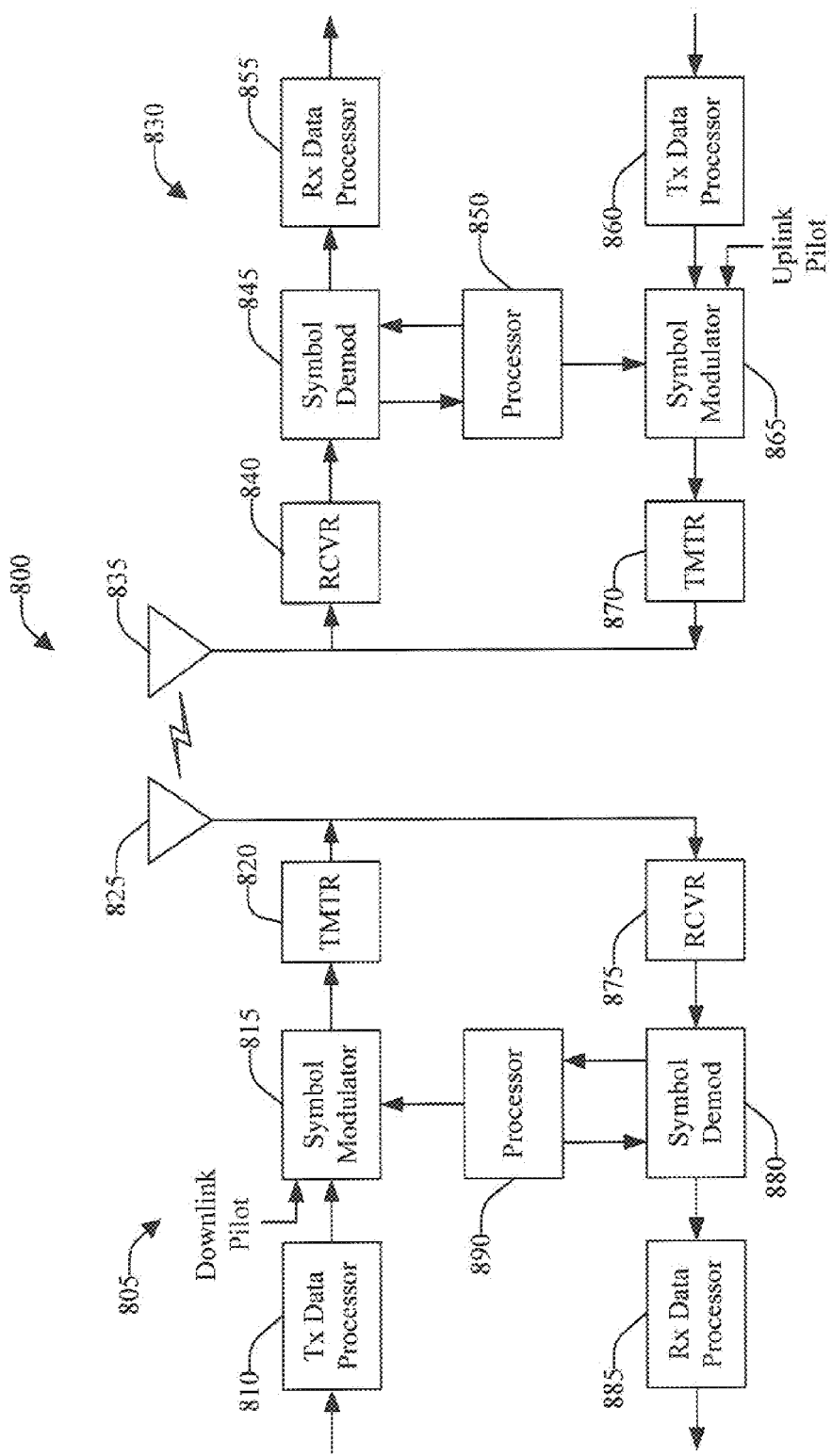
FIG. 8 illustrates a further communication system that generates/recognizes optimized RLC headers, according to a further aspect.

FIG. 8 illustrates an exemplary wireless communication system 800. Wireless communication system 800 depicts one base station and one terminal for sake of brevity. However, it is to be appreciated that system 800 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

As illustrated in FIG. 8, on a downlink, at access point 805, a transmit (TX) data processor 810 receives, formats, codes, interleaves, and modulates (or symbol maps) traffic data and provides modulation symbols ("data symbols"). A symbol modulator 815 receives and processes the data symbols and pilot symbols and provides a stream of symbols. A symbol modulator 815 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 820 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 825 to the terminals. At terminal 830, an antenna 835 receives the downlink signal and provides a received signal to a receiver unit (RCVR) 840.

Receiver unit 840 conditions (e.g., filters, amplifies, and frequency downconverts) the received signal and digitizes the conditioned signal to obtain samples. A symbol demodulator 845 obtains N received symbols and provides received pilot symbols to a processor 850 for channel estimation. Symbol demodulator 845 further receives a frequency response estimate for the downlink from processor 850, performs data demodulation on the received data symbols to obtain data symbol estimates (which are estimates of the transmitted data symbols), and provides the data symbol estimates to an RX data processor 855, which demodulates (i.e., symbol demaps), deinterleaves, and decodes the data symbol estimates to recover the transmitted traffic data. The processing by symbol demodulator 845 and RX data processor 855 is complementary to the processing by symbol modulator 815 and TX data processor 810, respectively, at access point 805.

On the uplink, a TX data processor 860 processes traffic data and provides data symbols. A symbol modulator 865 receives and multiplexes the data symbols with pilot symbols, performs modulation, and provides a stream of symbols. A transmitter unit 870 then receives and processes the stream of symbols to generate an uplink signal, which is transmitted by the antenna 835 to the access point 805.

At access point 805, the uplink signal from terminal 830 is received by the antenna 825 and processed by a receiver unit 875 to obtain samples. A symbol demodulator 880 then processes the samples and provides received pilot symbols and data symbol estimates for the uplink. An RX data processor 885 processes the data symbol estimates to recover the traffic data transmitted by terminal 830. A processor 890 performs channel estimation for each active terminal transmitting on the uplink.

Processors 890 and 850 direct (e.g., control, coordinate, manage, . . . ) operation at access point 805 and terminal 830, respectively. Respective processors 890 and 850 can be associated with memory units (not shown) that store program codes and data. Processors 890 and 850 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 890 and 850.

Figure 9:
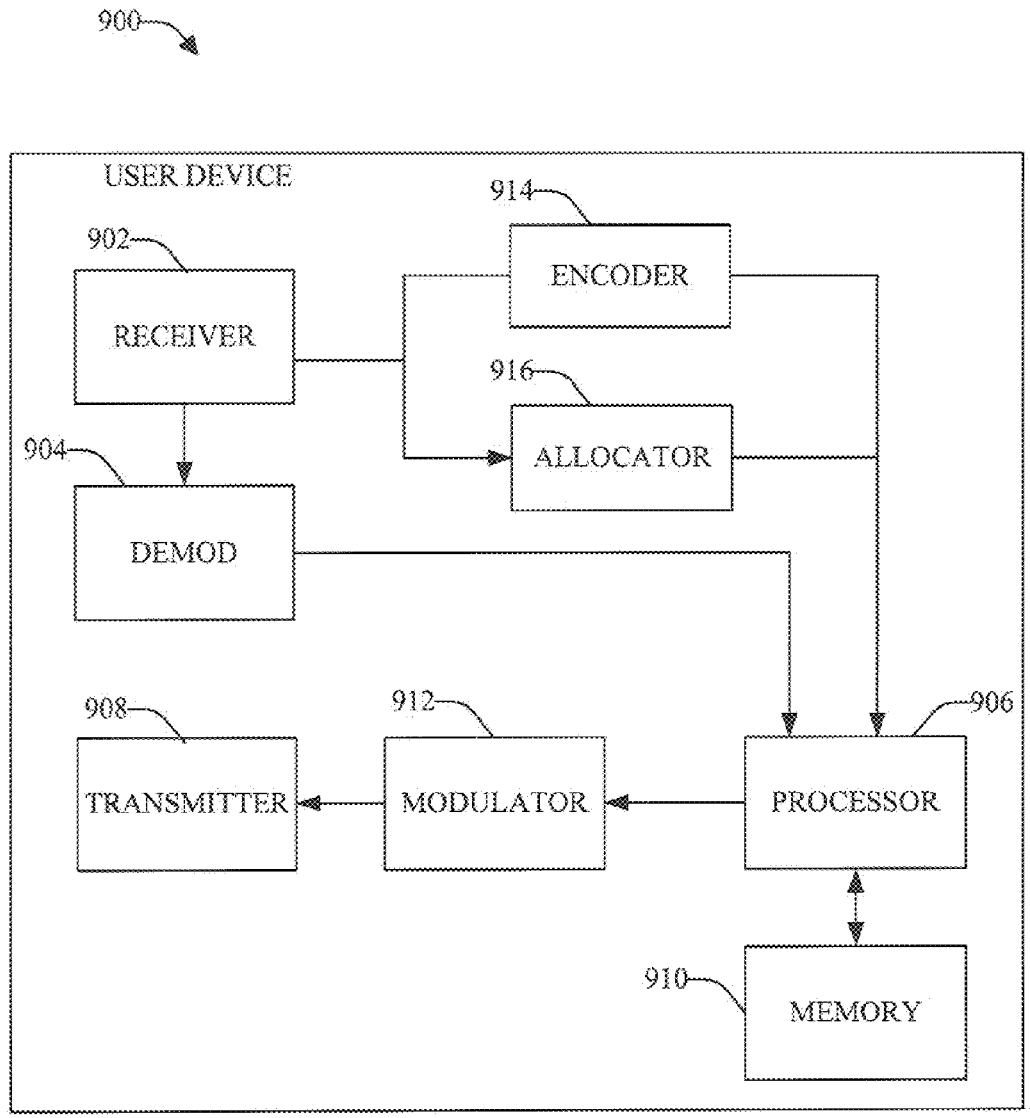
FIG. 9 illustrates a system that facilitates generating and/or recognizing optimized RLC headers in accordance with one or more of the disclosed aspects.

With reference now to FIG. 9, illustrated is a system 900 that facilitates generating and/or recognizing optimized RLC headers in accordance with one or more of the disclosed aspects. System 900 can reside in a user device. System 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with sample rearrangement. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 can further comprise a symbol modulator 912 and a transmitter 908 that transmits the modulated signal.

Receiver 902 is further operatively coupled to an encoder 914 that scrambles a Walsh Sequence with a random sequence to produce a scrambled sequence. The encoder 914 can be provided with the random sequence so that a single FHT can be utilized to decode the sequence. Additionally, receiver 902 can be operatively coupled to an allocator 916 that receive an assignment of one or more sub-sequences of the scrambled sequence. The transmitter 908 can send the scrambled sequence as an access-based handoff probe. In response to the access probe, receiver 902 can receive an Access Grant, which can be transmitted over a Shared Signaling MAC Protocol.

Figure 10:
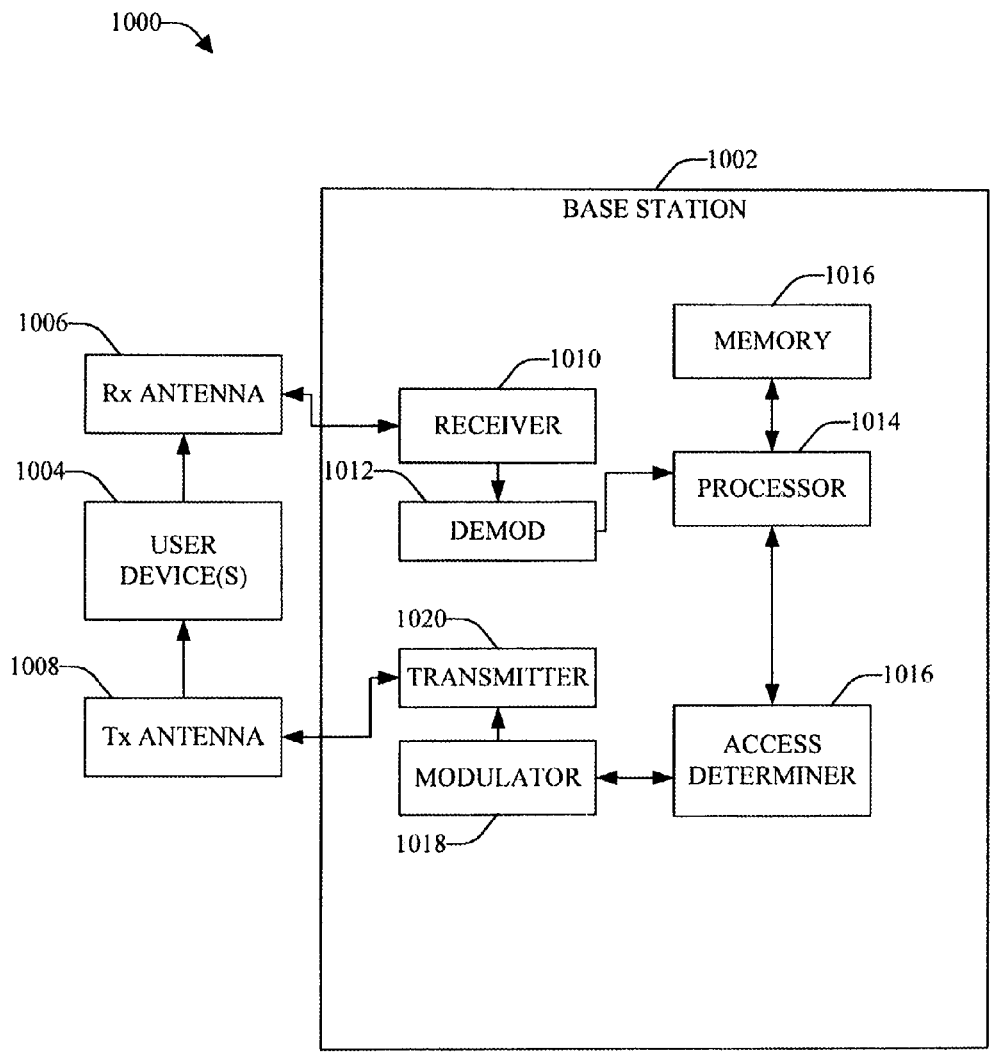
FIG. 10 is an illustration of a system that facilitates optimizing RLC headers in accordance with various aspects presented herein.

FIG. 10 is an illustration of a system 1000 that facilitates optimizing RLC headers in accordance with various aspects presented herein. System 1000 comprises a base station or access point 1002. As illustrated, base station 1002 receives signal(s) from one or more user devices 1004 by a receive antenna 1006, and transmits to the one or more user devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to broadcast-multicast waveforms embedded in a unicast waveform. A modulator 1018 can multiplex the signal for transmission by a transmitter 1020 through transmit antenna 1008 to user devices 1004.

Processor 1014 is further coupled to an access determiner 1016. Receiver 1010 can receive an access probe from one or more mobile devices that desire to gain access to a sector served by base station 1002. Demodulator 1012 can demodulate a Walsh Sequence included in the access probe utilizing an FHT. Access determiner 1016 can selectively Grant the one or more mobile devices access to the sector.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels includes a Dedicated Traffic Channel (DTCH) that is Point-to-point bi-directional channel, dedicated to one UE, for the transfer of user information. Also, one can employ a Multicast Traffic Channel (MTCH) for Point-to-multipoint DL channel for transmitting traffic data.

In another aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UIE), broadcasted over entire cell and mapped to PHY resources which can be used for other control/traffic channels. T he UL Transport Channels comprises a Random Access Channel (RACH), a Request Channel (REQCH), a Uplink Shared Data Channel (UL-SDCH) and plurality of PHY channels. The PHY channels comprises a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C—Control—
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U—User—
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for optimizing Radio Link Control (RLC) headers comprising:
    implementing, by one or more processors, a segment offset (SO) field in a RLC header to designate resegmented packets for lost protocol data units;
    implementing, by the one or more processors, a length indicator (LSO) for the SO field in the RLC header, to further accommodate a variable size of the SO field in the RLC header; and
    implementing, by the one or more processors, a Last Segment Flag (LSF) in the RLC header to identify a last segment of a protocol data unit (PDU).

2. The method of claim 1 further comprising implementing, by the one or more processors, a two bit Segment Indicator (SI) field as part of the RLC header to indicate presence of a whole Service Data Unit (SDU) at beginning or at an ending of a transmittal for VoIP packets.

3. The method of claim 2 further comprising examining, by the one or more computer processors, the SI to verify segmentations.

4. The method of claim 1 further comprising implementing, by the one or more processors, a four bit Sequence Number (SN) as part of the RLC header for VoIP packets.

5. The method of claim 1, further comprising:
    implementing, by the one or more processors, a length indicator (LI) to indicate length of a service data unit (SDU); and
    implementing, by the one or more processors, a length of the length indicator (LLI) for the LI in the RLC header, to further accommodate a variable size of the LI.

6. A wireless communications apparatus, comprising:
    at least one processor configured to:
        implement a segment offset (SO) field in a RLC header to designate resegmented packets for lost protocol data units (PDUs);
        implement a length indicator (LSO) for the SO field in the RLC header, to further accommodate a variable size thereof-of the SO field in the RLC header; and
        implement a Last Segment Flag (LSF) in the RLC header to identify a last segment of a PDU.

7. The wireless communications apparatus of claim 6, the RLC header further comprising a two bit Segment Indicator (SI) field to indicate presence of a whole Service Data Unit (SDU) at beginning or at an ending of a transmittal for VoIP packets.

8. The wireless communications apparatus of claim 6, the RLC header further comprising a four bit Sequence Number (SN) for VoIP packets.

9. The wireless communications apparatus of claim 6, the RLC header further comprising:
    a length indicator (LI) to indicate length of a service data unit (SDU); and
    a length indicator (LLI) for the LI in the RLC header, to further accommodate a variable size of the LI.

10. A wireless communication apparatus for optimizing RLC headers comprising:
    designating means for designating resegmented data packets for lost protocol data units in a RLC header;
    means for accommodating a variable size for the designating means; and
    means for identifying a last segment for last segment of a Protocol Data Unit (PDU) in the RLC header.

11. The wireless communication apparatus of claim 10 the RLC header further comprising a two bit Segment Indicator (SI) field to indicate presence of a whole Service Data Unit (SDU) at beginning or at an ending of a transmittal for VoIP packets.

12. The wireless communication apparatus of claim 10 the RLC header further comprising a four bit Sequence Number (SN) for VoIP packets.

13. The wireless communication apparatus of claim 10, the RLC header further comprising:
    a length indicator (LI) to indicate length of a service data unit (SDU); and
    a length indicator (LLI) for the LI in the RLC header, to further accommodate a variable size of the LI.

14. A computer program product comprising
    a non-transitory computer-readable medium having stored thereon code for optimizing Radio Link Control (RLC) headers, the code comprising:
        code for causing at least one computer to implement a segment offset (SO) field in a RLC header and further designate resegmented packets for lost protocol data units;
        code for causing the at least one computer to implement a length indicator (LSO) for the SO field in the RLC header, to further accommodate a variable size of the SO field in the RLC header; and
        code for causing the at least one computer to implement a Last Segment Flag (LSF) in the RLC header and identify a last segment of a Protocol Data Unit (PDU).

15. The computer program product of claim 14, the RLC header further comprising a two bit Segment Indicator (SI) field to indicate presence of a whole Service Data Unit (SDU) at beginning or at an ending of a transmittal for VoIP packets.

16. The computer program product of claim 14, the RLC header further comprising a four bit Sequence Number (SN) for VoIP packets.

17. The computer program product of claim 14, the RLC header further comprising:
    a length indicator (LI) to indicate length of a service data unit (SDU); and
    a length indicator (LLI) for the LI in the RLC header, to further accommodate a variable size of the LI.

18. A method of receiving a Radio Link Control (RLC) transmission comprising:
    receiving an RLC header having a segment offset (SO) field that designates resegmented packets for lost protocol data units;
    further receiving a length indicator (LSO) for the SO field in the RLC header, to further accommodate a variable size of the SO field in the RLC header; and
    identifying a last segment of a Protocol Data Unit (PDU) via a Last Segment Flag (LSF) in the RLC header.

19. The method of claim 18 further comprising receiving a two bit Segment Indicator (SI) field as part of the RLC header to indicate presence of a whole Service Data Unit (SDU) at beginning or at an ending of a transmittal for VoIP packets.

20. The method of claim 18 further comprising receiving four bit Sequence Number (SN) as part of the RLC header for VoIP packets.

21. The method of claim 18 further comprising verifying whether a last bit is an end of a Service Data Unit (SDU).

22. The method of claim 18 further comprising receiving a PDU having a partial Service Data Unit (SDU).

23. The method of claim 18, further comprising:
  receiving a length indicator (LI) to indicate length of a service data unit (SDU); and
  receiving a length of the length indicator (LLI) for the LI in the RLC header, to further accommodate a variable size of the LI.

24. A wireless communications apparatus for receiving a Radio Link Control (RLC) header, comprising:
  at least one processor configured to
    receive the RLC header having a segment offset (SO) field that designates resegmented packets for lost protocol data units;
    further receive a length indicator (LSO) for the SO field in the RLC header, to further accommodate a variable size of the SO field in the RLC header; and
    identify a last segment of a Protocol Data Unit (PDU) via a Last Segment Flag (LSF) in the RLC header.

25. The wireless communication apparatus of claim 24, the at least one processor further configured to receive four bit Sequence Number (SN) as part of the RLC header for VoIP packets.

26. The wireless communications apparatus of claim 24, the at least one processor further configured to:
  receive a length indicator (LI) to indicate length of a service data unit (SDU); and
  receive a length indicator (LLI) for the LI in the RLC header, to further accommodate a variable size of the LI.

* * * * *